(12) United States Patent
Singh

(10) Patent No.: US 8,310,963 B2
(45) Date of Patent: Nov. 13, 2012

(54) SYSTEM AND METHOD FOR SYNCHRONIZED TIME-DIVISION DUPLEX SIGNAL SWITCHING

(75) Inventor: Baljit Singh, San Jose, CA (US)

(73) Assignee: ADC Telecommunications, Inc., Shakopee, MN (US)

( * ) Notice: Subject to any disclaimer, the term of this patent is extended or adjusted under 35 U.S.C. 154(b) by 688 days.

(21) Appl. No.: 12/144,939

(22) Filed: Jun. 24, 2008

(65) Prior Publication Data

US 2009/0316609 A1 Dec. 24, 2009

(51) Int. Cl.
*H04J 3/00* (2006.01)
(52) U.S. Cl. .......................... 370/280; 370/293
(58) Field of Classification Search ............. 370/280, 370/281
See application file for complete search history.

(56) References Cited

U.S. PATENT DOCUMENTS

| | | | |
|---|---|---|---|
| 4,183,054 A | 1/1980 | Patisaul et al. |
| 4,451,916 A | 5/1984 | Casper et al. |
| 4,611,323 A | 9/1986 | Hessenmuller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,377,255 A | 12/1994 | Beasley |
| 5,381,459 A | 1/1995 | Lappington |
| 5,400,391 A | 3/1995 | Emura et al. |
| 5,461,627 A | 10/1995 | Rypinski |
| 5,519,691 A | 5/1996 | Darcie et al. |
| 5,545,397 A | 8/1996 | Spielvogel |

(Continued)

FOREIGN PATENT DOCUMENTS

CA 2058736 7/1993

(Continued)

OTHER PUBLICATIONS

International Searching Authority, "International Search Report", Jan. 29, 2010, Published in: WO.
Uyehara, "Distributed Digital Reference Clock", "U.S. Appl. No. 12/845,060, filed Jul. 28, 2010", , pp. 1-37, Published in: US.
Fischer et al., "Distributed Antenna System With Combination of Both All Digital Transport and Hybrid Digital/Analog Transport", "U.S. Appl. No. 12/913,179, filed Oct. 27, 2010", , pp. 1-71, Published in: US.

(Continued)

*Primary Examiner* — Anh-Vu Ly
*Assistant Examiner* — Matthew Hopkins
(74) *Attorney, Agent, or Firm* — Fogg & Powers LLC

(57) ABSTRACT

A system comprises a first unit and a second unit communicatively coupled to the first unit. The first unit is operable to receive a first original radio frequency signal and the second unit is operable to receive a second original radio frequency signal. The first and second original radio frequency signals are originally transmitted on a radio frequency channel using time division duplexing. The first unit communicates a control signal to the second unit, the first unit generating the control signal based at least in part on detecting when the first original radio frequency signal is being received at the first unit. The second unit uses the control signal to determine when to output a first reproduced radio frequency signal in accordance with the time division duplexing used to originally transmit the first and second original radio frequency signals on the radio frequency channel. The first reproduced radio frequency signal is derived from the first original radio frequency signal.

59 Claims, 5 Drawing Sheets

U.S. PATENT DOCUMENTS

| | | | |
|---|---|---|---|
| 5,566,168 | A | 10/1996 | Dent |
| 5,621,786 | A | 4/1997 | Fischer et al. |
| 5,627,879 | A | 5/1997 | Russell et al. |
| 5,634,191 | A | 5/1997 | Beasley |
| 5,642,405 | A | 6/1997 | Fischer et al. |
| 5,644,622 | A | 7/1997 | Russell et al. |
| 5,657,374 | A | 8/1997 | Russell et al. |
| 5,678,177 | A | 10/1997 | Beasley |
| 5,682,256 | A | 10/1997 | Motley et al. |
| 5,687,195 | A | 11/1997 | Hwang et al. |
| 5,732,076 | A | 3/1998 | Ketseoglou et al. |
| 5,761,619 | A | 6/1998 | Danne et al. |
| 5,765,099 | A | 6/1998 | Georges et al. |
| 5,781,541 | A | 7/1998 | Schneider |
| 5,781,859 | A | 7/1998 | Beasley |
| 5,802,173 | A | 9/1998 | Hamilton-Piercy et al. |
| 5,805,983 | A | 9/1998 | Naidu et al. |
| 5,809,395 | A | 9/1998 | Hamilton-Piercy et al. |
| 5,822,324 | A | 10/1998 | Kostresti et al. |
| 5,852,651 | A | 12/1998 | Fischer et al. |
| 5,867,292 | A | 2/1999 | Crimmins et al. |
| 5,907,544 | A | 5/1999 | Rypinski |
| 5,924,022 | A | 7/1999 | Beasley et al. |
| 5,987,014 | A | 11/1999 | Magill et al. |
| 6,023,628 | A | 2/2000 | Beasley |
| 6,034,950 | A | 3/2000 | Sauer et al. |
| 6,108,113 | A | 8/2000 | Fee |
| 6,108,550 | A | 8/2000 | Wiorek et al. |
| 6,108,626 | A | 8/2000 | Cellario et al. |
| 6,157,659 | A | 12/2000 | Bird |
| 6,157,810 | A | 12/2000 | Georges et al. |
| 6,188,693 | B1 | 2/2001 | Murakami |
| 6,205,133 | B1 | 3/2001 | Bexten |
| 6,222,660 | B1 | 4/2001 | Traa |
| 6,226,274 | B1 | 5/2001 | Reese et al. |
| 6,246,675 | B1 | 6/2001 | Beasley et al. |
| 6,373,887 | B1 | 4/2002 | Aiyagari et al. |
| 6,377,640 | B2 | 4/2002 | Trans |
| 6,498,936 | B1 | 12/2002 | Raith |
| 6,567,473 | B1 | 5/2003 | Tzannes |
| 6,667,973 | B1 | 12/2003 | Gorshe et al. |
| 6,674,966 | B1 | 1/2004 | Koonen |
| 6,704,545 | B1 | 3/2004 | Wala |
| 6,729,929 | B1 | 5/2004 | Sayers et al. |
| 6,768,745 | B1 | 7/2004 | Gorshe et al. |
| 6,785,558 | B1 | 8/2004 | Stratford et al. |
| 6,801,767 | B1 * | 10/2004 | Schwartz et al. ............ 455/426.2 |
| 6,826,163 | B2 | 11/2004 | Mani et al. |
| 6,826,164 | B2 | 11/2004 | Mani et al. |
| 6,831,901 | B2 | 12/2004 | Millar |
| 6,865,390 | B2 | 3/2005 | Goss et al. |
| 6,917,614 | B1 | 7/2005 | Laubach et al. |
| 7,127,175 | B2 | 10/2006 | Mani et al. |
| 7,205,864 | B2 | 4/2007 | Schultz, Jr. et al. |
| 7,215,651 | B2 | 5/2007 | Millar |
| 7,250,830 | B2 | 7/2007 | Layne et al. |
| 7,289,972 | B2 | 10/2007 | Rieser et al. |
| 7,313,415 | B2 | 12/2007 | Wake et al. |
| 2001/0036163 | A1 | 11/2001 | Sabat, Jr. et al. |
| 2001/0044292 | A1 | 11/2001 | Jeon et al. |
| 2002/0167954 | A1 | 11/2002 | Highsmith et al. |
| 2002/0191565 | A1 | 12/2002 | Mani et al. |
| 2003/0015943 | A1 | 1/2003 | Kim et al. |
| 2003/0043928 | A1 | 3/2003 | Ling et al. |
| 2004/0010609 | A1 | 1/2004 | Vilander et al. |
| 2004/0037565 | A1 | 2/2004 | Young et al. |
| 2004/0106387 | A1 | 6/2004 | Bauman et al. |
| 2004/0106435 | A1 | 6/2004 | Bauman et al. |
| 2004/0132474 | A1 | 7/2004 | Wala |
| 2004/0198453 | A1 | 10/2004 | Cutrer et al. |
| 2004/0203339 | A1 | 10/2004 | Bauman |
| 2004/0203703 | A1 | 10/2004 | Fischer |
| 2004/0219950 | A1 | 11/2004 | Pallonen et al. |
| 2005/0147067 | A1 | 7/2005 | Mani et al. |
| 2005/0201323 | A1 | 9/2005 | Mani et al. |
| 2005/0250503 | A1 | 11/2005 | Cutrer |
| 2006/0087980 | A1 | 4/2006 | Ikeda |
| 2006/0121944 | A1 | 6/2006 | Buscaglia et al. |
| 2006/0153070 | A1 | 7/2006 | DelRegno et al. |
| 2006/0172775 | A1 | 8/2006 | Conyers et al. |
| 2006/0178162 | A1 | 8/2006 | Utakouji et al. |
| 2006/0193295 | A1 | 8/2006 | White et al. |
| 2007/0008939 | A1 | 1/2007 | Fischer |
| 2007/0201402 | A1 | 8/2007 | Cho et al. |
| 2007/0230590 | A1 | 10/2007 | Choi |
| 2007/0230592 | A1 | 10/2007 | Choi |
| 2007/0254692 | A1 * | 11/2007 | McCoy ...................... 455/553.1 |
| 2008/0062935 | A1 | 3/2008 | Nakagawa |
| 2008/0212658 | A1 * | 9/2008 | Rofougaran .................. 375/219 |
| 2009/0122731 | A1 * | 5/2009 | Montojo et al. ............. 370/280 |
| 2009/0185632 | A1 | 7/2009 | Cai |
| 2009/0296609 | A1 * | 12/2009 | Choi et al. ..................... 370/281 |
| 2009/0316608 | A1 | 12/2009 | Singh et al. |
| 2009/0316609 | A1 | 12/2009 | Singh |
| 2009/0316611 | A1 | 12/2009 | Stratford et al. |
| 2009/0318089 | A1 | 12/2009 | Stratford et al. |
| 2010/0041341 | A1 | 2/2010 | Stratford |
| 2010/0215028 | A1 | 8/2010 | Fischer |

FOREIGN PATENT DOCUMENTS

| | | |
|---|---|---|
| CA | 2058737 | 7/1993 |
| CA | 2069462 | 7/1993 |
| CA | 2087285 | 1/1994 |
| CA | 2138763 | 1/1994 |
| CA | 2156046 | 1/1995 |
| CA | 2125411 | 5/1995 |
| CA | 2128842 | 1/1996 |
| CA | 2134365 | 4/1996 |
| CA | 2158386 | 3/1997 |
| CA | 2168681 | 8/1997 |
| CA | 2215079 | 3/1999 |
| EP | 0391597 | 10/1990 |
| EP | 0876073 | 11/1998 |
| GB | 2253770 | 9/1992 |
| GB | 2289198 | 11/1995 |
| GB | 2315959 | 2/1998 |
| GB | 2320653 | 6/1998 |
| KR | 1020050123504 | 12/2005 |
| KR | 1020060057132 | 5/2006 |
| KR | 1020060061013 | 6/2006 |
| WO | 9115927 | 10/1991 |
| WO | 9413067 | 6/1994 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0174013 | 10/2001 |
| WO | 0174100 | 10/2001 |
| WO | 0182642 | 11/2001 |
| WO | 03079645 | 9/2003 |
| WO | 2007074949 | 7/2007 |

OTHER PUBLICATIONS

"DigivanceTM, Indoor Coverage Solution", "www.adc.com", 2001, pp. 1-8, Publisher: ADC.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

"Tektronix Synchronous Optical Network (SONET)", "http://www.iec.org/online/tutorials/sonet/topic03.html", Aug. 28, 2002, Publisher: International Engineering Consortium.

Uyehara et al., "Distinct Transport Path for Mimo Transmissions in Distributed Antenna Systems", "U.S. Appl. No. 13/004,998, filed Jan. 12, 2011".

* cited by examiner

SYSTEM AND METHOD FOR SYNCHRONIZED TIME-DIVISION DUPLEX SIGNAL SWITCHING

CROSS-REFERENCE TO RELATED APPLICATIONS

This application is related to the following co-pending applications filed on even date herewith, which are hereby incorporated herein by reference:

U.S. patent application Ser. No. 12/144,961, entitled "METHOD AND APPARATUS FOR FRAME DETECTION IN A COMMUNICATIONS SYSTEM," (the '921 application).

U.S. patent application Ser. No. 12/144,977, entitled "METHOD AND APPARATUS FOR SWITCHING IN A TDD SYSTEM," (the '916 application).

BACKGROUND

Time-division duplex (TDD) methods emulate full duplex communication over a half duplex communication link. In particular, signals that are communicated from a first device to a second device occur at a different time than when signals are communicated from the second device to the first device. Typically, one direction of communication is referred to as the "downlink" direction (and the corresponding signals are referred to here as "downlink signals" or "downlink communications"), and the other direction of communication is referred to as the "uplink" direction (and the corresponding signals are referred to here as "uplink signals" or "uplink communications"). For example, in some systems, separate downlink and uplink timeslots or sub-frames are assigned.

Many systems use TDD for communication. For example, some implementations of the Institute of Electrical and Electronics Engineers (IEEE) 802.16 standard use TDD for communication of wireless radio frequency signals. For example, the Worldwide Interoperability for Microwave Access (WIMAX) Forum has promulgated implementation profiles based on IEEE 802.16 that use TDD. In one such WIMAX profile, the amount of time assigned to communications in each direction is dynamically allocated. In other words, as the amount of uplink data increases more bandwidth in the form of a larger sub-frame is allocated to the uplink direction.

In order for successful communication between devices in a TDD system, the devices need to synchronize when they switch from communicating in the downlink direction to communicating in the uplink direction and when they switch from communicating in the uplink direction to communicating in the downlink direction. Otherwise, signals will be lost due to interference or missed because each device was not switched to the same signal direction. The IEEE 802.16 standard specifies the use of global positioning system (GPS) receivers to provide a precise time reference for synchronizing each device. Moreover, the IEEE 802.16 standard also contemplates that each device has the ability to demodulate and decode IEEE 802.16 frames and sub-frames in order to extract information indicating how long each of the downlink and uplink sub-frames will be. The extracted information is also used to determine when to switch communication directions.

In some locations, there may be issues with sending and receiving WIMAX signals. For example, there may be WIMAX coverage issues within buildings (such as office and apartment buildings, hospitals, and airports). One way to improve RF coverage within buildings makes use of a frequency translating distributed antenna system (DAS). For example, in one such distributed antenna system, downlink RF signals received at a donor antenna located on the roof of a building are down converted to an intermediate frequency (IF) signal by a hub unit and distributed over transport cabling (for example, optical fiber, coaxial cable, CATV cable, twisted-pair cabling) to a remote antenna unit located within the building. The downlink IF signals received at the remote antenna unit are up converted back to the original RF frequency and radiated from a remote antenna. Similarly, uplink RF signals received at the remote antenna are down converted by the remote antenna unit to IF signals and transported over transport cabling back to the hub unit. The uplink IF signals received at the hub unit are up converted back to the original RF frequency and radiated from the donor antenna. One example of such a distributed antenna system is described in U.S. Pat. No. 6,157,810.

However, such frequency translating distributed antenna system are often not suitable for use with TDD RF transmission schemes (such as TDD WIMAX implementations). For example, conventional frequency translating distributed antenna systems are typically designed for use with frequency division duplexing (FDD) systems (such as Global System for Mobile communications (GSM) and code division multiple access (CDMA) cellular systems). Moreover, GPS receivers typically do not work (or do not work very well) inside of buildings. Also, such frequency translating distributed antenna systems typically do not demodulate and decode the RF signals that they distribute.

SUMMARY

In one embodiment a system is provided. The system comprises a first unit and a second unit communicatively coupled to the first unit. The first unit is operable to receive a first original radio frequency signal and the second unit is operable to receive a second original radio frequency signal. The first and second original radio frequency signals are originally transmitted on a radio frequency channel using time division duplexing. The first unit communicates a control signal to the second unit, the first unit generating the control signal based at least in part on detecting when the first original radio frequency signal is being received at the first unit. The second unit uses the control signal to determine when to output a first reproduced radio frequency signal in accordance with the time division duplexing used to originally transmit the first and second original radio frequency signals on the radio frequency channel. The first reproduced radio frequency signal is derived from the first original radio frequency signal.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

In accordance with common practice, the various described features are not drawn to scale but are drawn to emphasize specific features relevant to the present invention. Like reference numbers and designations in the various drawings indicate like elements.

DETAILED DESCRIPTION

Figure 1:
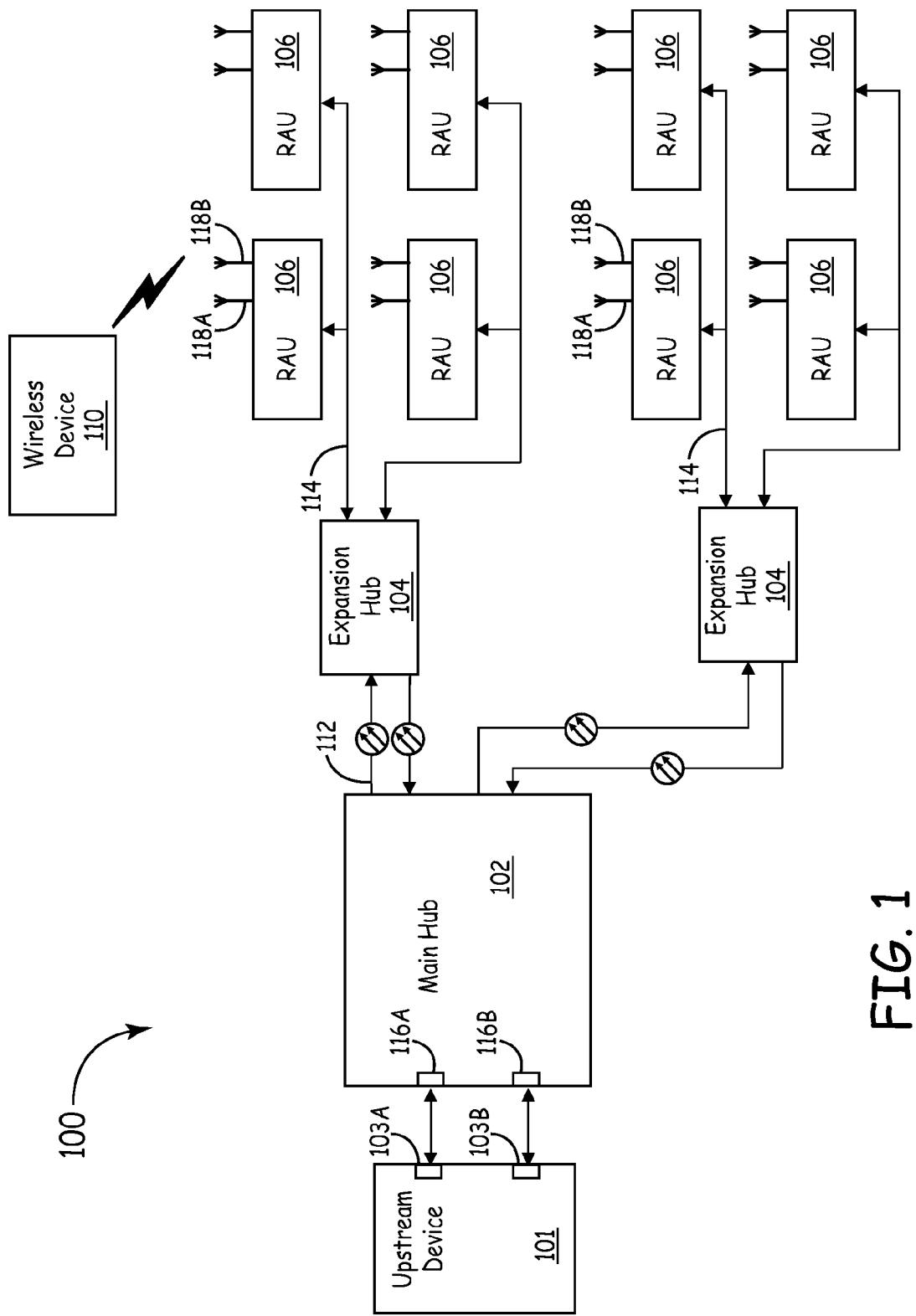
FIG. 1 is a block diagram of one embodiment of a system for distributing a TDD radio frequency signal.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

FIG. 1 is a block diagram of one embodiment of a distributed antenna system 100 for distributing a TDD radio frequency signal. The distributed antenna system 100 shown in FIG. 1 is described here as being implemented in order to distribute TDD WiMAX RF signals. However, it is to be understood that other embodiments can be implemented in other ways (for example, to distribute other types of TDD RF signals, such as Wireless Broadband or WiBro). The distributed antenna system 100 is used to transport radio frequency signals between one or more upstream devices 101 (such as base station transceivers or wireless access points or other sources of radio frequency signals) and one or more downstream wireless devices 110 (for example, mobile station, fixed wireless modem, or other wireless devices). In some embodiments, the upstream devices 101 are a part of a telecommunication-service providers' infrastructure while the downstream devices comprise customer premise equipment. In general, for each radio frequency signal or channel over which an upstream device 101 communicates with a downstream wireless device 110, an original downlink radio frequency signal is originally transmitted by the upstream device 101 for reception by the downstream wireless device 110 and an original uplink radio frequency signal is originally transmitted by the downstream wireless device 110 for reception by the upstream device 101. In the particular embodiments described here, a time division duplexing scheme is used to share each radio frequency channel. The DAS 100 is used to improve the wireless coverage of the upstream devices 101.

The distributed antenna system 100 includes a first unit that is communicatively coupled to one or more second units (for example, directly or via one or more intermediate units). In the exemplary embodiment of FIG. 1, the first unit comprises a main hub 102, the intermediary unit comprises expansion hub 104, and the second unit comprises remote antenna units (RAU) 106. Notably, although only eight RAUs 106 and two expansion hubs 104 are shown in this example, for purposes of explanation, other numbers of RAUs 106 and expansion hubs 104 can be used in other embodiments. In particular, in some embodiments, up to eight RAUs can be connected to each expansion hub 104 and up to four expansion hubs 104 can be coupled to the main hub 102.

In the particular embodiment shown in FIG. 1, the main hub 102 is communicatively coupled to the remote antenna units 106 via one or more intermediate expansion hubs 104. In such an embodiment, the main hub 102 is communicatively coupled to each of the expansion hubs 104 via one or more communication links 112. For example, in one embodiment described here in connection with FIG. 1, the links 112 comprise one or more fiber optic cables. In particular, as shown in FIG. 1, a separate optic fiber is used for the downlink and uplink signals between each expansion hub 104 and main hub 102. However, in other embodiments, a wavelength division multiplexing (WDM) optical combiner is used in expansion hubs 104 and main hub 102 in order to use a single fiber for both the uplink and downlink signals between each expansion hub 104 and main hub 102. The remote antenna units 106 are communicatively coupled to the expansion hub 104 via appropriate links 114. Appropriate links 114 include, for example, thin coaxial cabling, CATV cabling, or fiber optic cabling where multiple RF frequency bands are distributed or lower-bandwidth cabling, such as unshielded twisted-pair cabling, for example, where only a single RF frequency band is distributed.

The main hub 102 is communicatively coupled to one or more upstream devices 101 (such as base stations or wireless access points). In some embodiments, the main hub 102 is physically connected to the one or more upstream devices. In other embodiments, the main hub 102 is communicatively coupled to the one or more upstream devices in other ways (for example, using one or more donor antennas and one or more bi-directional amplifiers or repeaters).

In the particular embodiment shown in FIG. 1, the upstream device comprises a WiMAX base station 101. Also, the embodiment shown in FIG. 1 is described here providing support for the multiple-input multiple-output (MIMO) communication technology defined for some WiMAX system profiles. As a result, in this particular embodiment, the WiMAX base station 101 has two RF interfaces 103 (individually referenced as 103A and 103B), each of which is directly coupled (for example, via a respective coaxial cable) to a respective RF interface 116 (individually referenced as 116A and 116B) of the main hub 102.

In other embodiments, the hub 102 and the base station 101 is communicatively coupled to one another in other ways (for example, using a donor antenna located on a roof of the building in which distributed antenna system 100 is located to wirelessly send and receive RF signals with the WiMAX base stations 101).

Also, in the particular MIMO WiMAX embodiment shown in FIG. 1, each remote antenna unit 106 is coupled to two remote antennas 118 (individually referenced as 118A and 118B) from which RF signals are communicated to and from one or more wireless devices 110. It is to be understood, however, that in other embodiments, each remote antenna unit 106 is coupled to a different number of antennas (for example, a single antenna where a diplexer and filters are used to combine and separate RF signals as needed).

The DAS 100 is configured to support two radio frequency bands in the downlink direction and two radio frequency bands in the uplink direction. More specifically, the "downlink RF band A" is used to communicate downlink RF signals from RF interface 103A to the main hub 102 on RF interface 116A and, ultimately, to each of the remote antennas 118A to be radiated therefrom. The "downlink RF band B" is used to communicate downlink RF signals from RF interface 103B to the main hub 102 on RF interface 116B and, ultimately, to each of the remote antennas 118B to be radiated therefrom. The "uplink radio frequency band A" is used to communicate uplink RF signals received on each of the remote antennas 118A to RF interface 116A of the main hub 102 and, ultimately, to RF interface 103A of the WiMAX base station 102. The "uplink radio frequency band B" is used to communicate uplink RF signals received on each of the remote antennas 118B to RF interface 116B of the main hub 102 and, ultimately, to RF interface 103B of the WiMAX base station 101.

However, because of the use of MIMO communication technology in such an embodiment, the RF frequency band used for downlink RF signal band A is the same as the one used for downlink RF signal band B. Likewise, the RF frequency band used for uplink RF signal band A is the same as the one used for uplink RF signal band B. It is to be understood, that in other embodiments, however, the RF frequency band used for downlink RF signal band A differs from the one used for downlink RF signal band B.

Also, because of the use of TDD, the RF frequency band used for downlink RF signal band A is the same as the one used for uplink RF signal band A. Likewise, the RF frequency band used for downlink RF signal band B is the same as the one used for uplink RF signal band B. As a result, in the following description, reference is sometimes made to "RF band A" and "RF band B". However, as noted above, the use of TDD requires the main hub 102 and each remote antenna unit 106, for each of the RF bands A and B, to switch between communicating in a downlink direction (that is, from the main hub 102 to the remote antenna unit 106) and communicating in an uplink direction (that is, from each remote antenna unit 106 to the main hub 102) and between communicating in the uplink direction and communicating in the downlink direction.

In the particular MIMO WiMAX embodiment shown in FIG. 1, the WiMAX base station 101 transmits two original downlink RF signals from the respective RF interfaces 103, both original downlink RF signals being transmitted in the same RF frequency band. The original downlink RF signals are supplied to respective interfaces 116 of the main hub 102. As is described in more detail below, each of the original downlink RF signals is separately filtered and down converted to an intermediate frequency (IF). The original downlink RF signals are down converted to different IF frequency bands. The two downlink IF signals are combined (that is, multiplexed using frequency division multiplexing (FDM)) for distribution to the remote antenna units 106.

The combined downlink IF signals are communicated to each expansion hub 104 over a respective fiber link 112 using an analog optical modulator. Each expansion hub 104 receives and demodulates the optical signal to recover the combined downlink IF signal, which is then transmitted to each of the remote antenna units 106 that are coupled to that expansion hub 104 using the cabling 114. Each remote antenna unit 106 receives the combined IF signal and separates the IF signals into separate IF signals for each downlink RF signal that was originally received from the WiMAX base station 101. The remote antenna unit 106 then upconverts each such separated IF signal to its original RF frequency as was received from the WiMAX base station 101 (which is the same for both) in order to reproduce each original downlink radio frequency signal. The reproduced downlink RF signal that corresponds to downlink radio frequency band A is then radiated from remote antenna 118A for that remote antenna unit 106, and the reproduced downlink RF signal that corresponds to downlink radio frequency band B is then radiated from remote antenna 118B for that remote antenna unit 106. Both reproduced downlink RF signals are radiated for reception by a suitable wireless device 110 (if any) that is located within the coverage area of that remote antenna unit 106.

A similar process is performed in the uplink direction. Each wireless device 110 transmits two original uplink RF signals from two respective antennas. At each remote antenna unit 106, each of the remote antennas 118A and 118B for that RAU 106 receives the two original uplink RF signals. The received original uplink RF signals are filtered to remove out-of-band signals. The remote antenna unit 106 downconverts each such uplink RF channel to a different intermediate frequency (IF) for distribution back to the main hub 102 via an expansion hub 104. The downconverted uplink IF channels are combined (using FDM) and communicated to each expansion hub 104 over a respective cable 114. Each expansion hub 104 combines the various IF uplink signals it receives from the remote antenna units 106 that are coupled thereto and communicates the combined IF channels to the main hub 102 over a fiber link 112 using an analog optical modulator. The main hub 102 receives and demodulates the optical signal from each expansion hub 104 to recover the combined uplink IF signal transmitted from that expansion hub 104. The recovered combined uplink IF signals from all of the expansion hubs 106 are then combined. The main hub 102 then separates that combined uplink IF signal into separate uplink IF signals, one of which corresponds to those of uplink RF band A and the other of which corresponds to uplink RF band B.

The main hub 102 then upconverts each such separated IF signal to its original RF frequency as was received over the air (which is the same for both uplink RF bands A and B in this embodiment) in order to reproduce each original uplink radio frequency signal. Each reproduced uplink RF channel is then communicated to a respective RF interface 103 of the WiMAX base station 101 via a respective RF interface 116 of the main hub 102. That is, the reproduced uplink RF signal that corresponds to uplink RF band A are communicated to RF interface 103A of the WiMAX base station 101 via RF interface 116A of the main hub 102, and the reproduced uplink RF signal that corresponds to those uplink RF band B are communicated to RF interface 103B of the WiMAX base station 101 via RF interface 116B of the main hub 102.

In other embodiments, separation of the signals is not required if the IF and RF frequencies are selected such that block upconverters and block downconverters can be used (instead of using separate, individual narrowband upconverters and downconverters). In the simplest example of such an embodiment, if the system were designed to distribute multi-carrier GSM in the 900 MHz band and each carrier were located at the correct frequency offset from each other, the entire IF spectrum could be upconverted as one continuous block versus having individual narrow band upconverters and likewise with the downconversion of the RF spectrum Power may also be provided to the remote antenna units 106 over the cabling 114 such that no additional power source is needed to power the remote antenna units 106.

The DAS 100 may include one or more of the following: filtering, amplification, wave division multiplexing, duplexing, synchronization, and monitoring functionality as needed. More specifically, the main hub 102 is configured to distribute a TDD control signal for each RF band A and B along with the multiplexed downlink signals to each RAU 106. A TDD control signal for each of the frequency bands A and B indicates when each RAU 106 is to switch the communication direction for that frequency band so that the switching in each RAU 106 and the hub 102 is synchronized. Additionally, since each frequency band has its own TDD control signal, each frequency band can switch independently. This enables the connection of separate upstream devices to each of the RF interfaces 116 of the main hub 102.

Figure 2A:
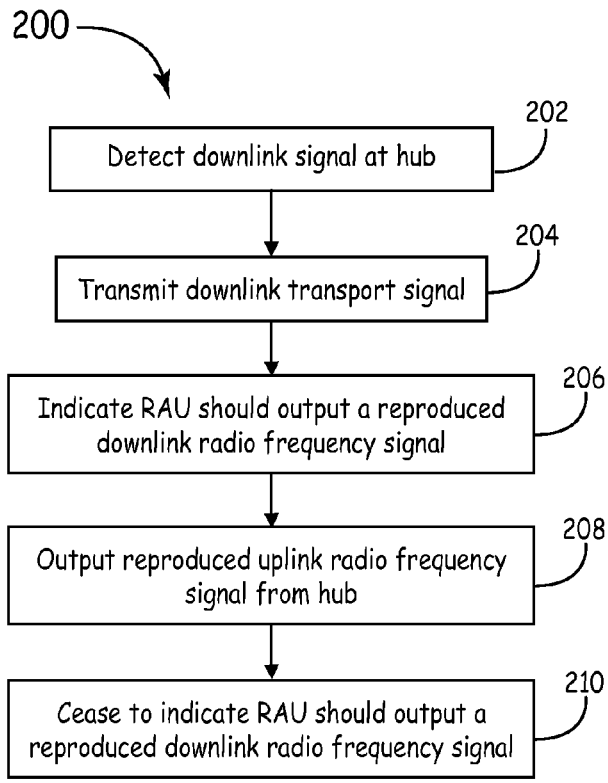
FIGS. 2A-2B are flow diagrams illustrating methods of distributing a time division duplexing control signal in a communication system that makes use of time division duplexing.
Figure 2B:
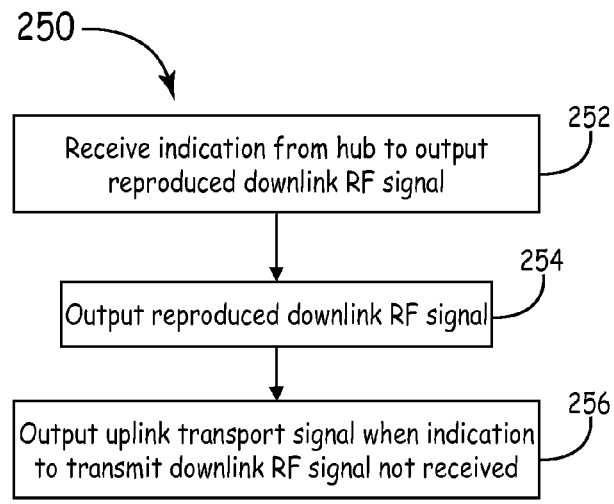

FIGS. 2A-2B are flow diagrams illustrating methods 200 and 250, respectively, of distributing a time division duplexing control signal in a communication system that makes use of time division duplexing. In the following description of FIGS. 2A-2B, methods 200 and 250 are described here as being implemented in connection with the DAS 100 of FIG. 1. More specifically, method 200 of FIG. 2A is described here as being implemented using the main hub 102, and method 250 of FIG. 2B is described here as being implanted using the remote antenna unit 106. It is to be understood that the method 200 can be implemented in other types of communication systems that make use of TDD. Moreover, methods 200 and 250 are also described here with reference to one of the frequency bands supported by the DAS 100 of FIG. 1, though it is to be understood that such processing is also performed for the other frequency band.

Method 200 of FIG. 2A comprises detecting when the main hub 102 is receiving an original downlink radio frequency signal in the relevant frequency band (block 202). When it is detected that the main hub 102 is receiving an original downlink radio frequency signal in the relevant frequency band, the main hub 102 outputs in the downlink direction a downlink transport signal derived from the original radio frequency signal received at the main hub 102 for the relevant frequency band (block 204). If necessary, the main hub 102 switches from communicating in the uplink direction to communicating in the downlink direction. Also, when it is detected that the main hub 102 is receiving an original downlink radio frequency signal in the relevant frequency band, the main hub 102 indicates to the remote antenna units 106 that the remote antenna units 106 should output a reproduced downlink radio frequency signal for the relevant frequency band (block 206). The reproduced downlink radio frequency signal is generated by each remote antenna unit 106 from a downlink transport signal received at that remote antenna unit 106. In one implementation, the main hub 102 indicates to the remote antenna units 106 that the remote antenna units 106 should output a reproduced downlink radio frequency signal for the relevant frequency band by outputting a control signal.

When it is detected that the main hub 102 is not receiving an original downlink radio frequency signal in the relevant frequency band, the main hub 102 outputs a reproduced uplink radio frequency signal derived at least in part from an uplink transport signal received from at least one remote antenna unit 106 (block 208). If necessary, the main hub 102 switches from communicating in the downlink direction to communicating in the uplink direction. The uplink transport signal is generated by the at least one remote antenna unit 106 at least in part from at least a portion of an original uplink radio frequency signal originally received at the remote antenna unit 106 for the relevant frequency band. The main hub 102 outputs the reproduced uplink radio frequency signal on an appropriate RF interface 116, from which the reproduced uplink radio frequency signal is communicated to the upstream device 101 that is communicatively coupled the main hub 102 via that RF interface 116. Also, when it is detected that the main hub 102 is not receiving an original downlink radio frequency signal in the relevant frequency band, the main hub 102 does not indicate to at least one remote antenna units 106 that the remote antenna unit 106 should output a reproduced downlink radio frequency signal for the relevant frequency band (block 210). In one implementation, the main hub 102 does this by not outputting a control signal (or by outputting a different control signal or by outputting a control signal having different information modulated or encoded thereon).

In an alternative embodiment, when it is detected that the main hub 102 is not receiving an original downlink radio frequency signal in the relevant frequency band, the main hub 102 indicates to the at least one remote antenna unit 102 that it should output an uplink transport signal for the relevant frequency band. The uplink transport signal is generated by each such remote antenna unit 106 at least in part from at least a portion of an original uplink radio frequency signal received at that remote antenna unit 106. The uplink transport signal from each such remote antenna unit 106 is communicated to the main hub 102 (for example, via expansion hub 104).

Method 250 is performed at each remote antenna unit 106. When the remote antenna unit 106 receives an indication from the main hub 102 that the remote antenna unit 106 should output a reproduced downlink radio frequency signal for the relevant frequency band (block 252), the remote antenna unit 106 outputs a reproduced downlink radio frequency signal derived at least in part from a downlink transport signal received from the main hub 102 (block 254). In one implementation, the indication is a control signal output from the main hub 102. If necessary, the remote antenna unit 106 switches from communicating in the uplink direction to communicating in the downlink direction. The reproduced downlink radio frequency signal is generated by the remote antenna unit 106 from a downlink transport signal received at that remote antenna unit 106 from the main hub 102. In this particular embodiment, the reproduced downlink radio frequency signal is output on an appropriate RF interface of the remote antenna unit 106, which in turn is coupled to an antenna 118 from which the reproduced downlink radio frequency signal is radiated for reception by any wireless devices 110 that are in the coverage area of the remote antenna unit 106.

When the remote antenna unit 106 does not receive an indication from the main hub 102 that the remote antenna unit 106 should output a reproduced downlink radio frequency signal for the relevant frequency band, the remote antenna unit 106 outputs an uplink transport signal for the relevant frequency band (block 256). The remote antenna unit 106 generates the uplink transport signal at least in part from at least a portion of an original uplink radio frequency signal received at that remote antenna unit 106. The uplink transport signal is communicated from the remote antenna unit 106 to the main hub 102 (for example, via expansion hub 104). If necessary, the remote antenna unit 106 switches from communicating in the downlink direction to communicating in the uplink direction. In an alternative embodiment where the main hub 102 affirmatively indicates to the at least one remote antenna unit 102 that it should output an uplink transport signal for the relevant frequency band, the remote antenna unit 106 outputs the uplink transport signal when indicated to do so by the main hub 102.

In one implementation of such an embodiment of methods 200 and 250, the main hub 102 outputs a TDD control signal that each remote antenna 106 unit uses to determine when it should communicate in the downlink direction and when it should communicate in the uplink direction. For example, in one such implementation, the main hub 102 outputs the TDD control signal when each remote unit should communicate in the downlink direction for the relevant frequency band and does not output the TDD control signal when each remote unit should communicate in the uplink direction for the relevant frequency band. The expansion hub 104, in such an implementation, simply passes the TDD control signal onto each remote antenna unit 106. In such an implementation, each remote antenna unit 106 is able to determine that it should communicate in the downlink direction when it determines that the main hub 102 is outputting the TDD control signal and is able to determine that is should communicate in the uplink direction with it determines that the main hub 102 is not outputting the TDD control signal.

Moreover, the techniques described below do not require that the underlying RF signals be demodulated or decoded for the DAS 100 to be able to support the TDD scheme used for communicating the original RF signals. Thus, neither the main hub 102 nor the remote antenna units 106 need to include such functionality in order to support such a TDD scheme.

Figure 3:
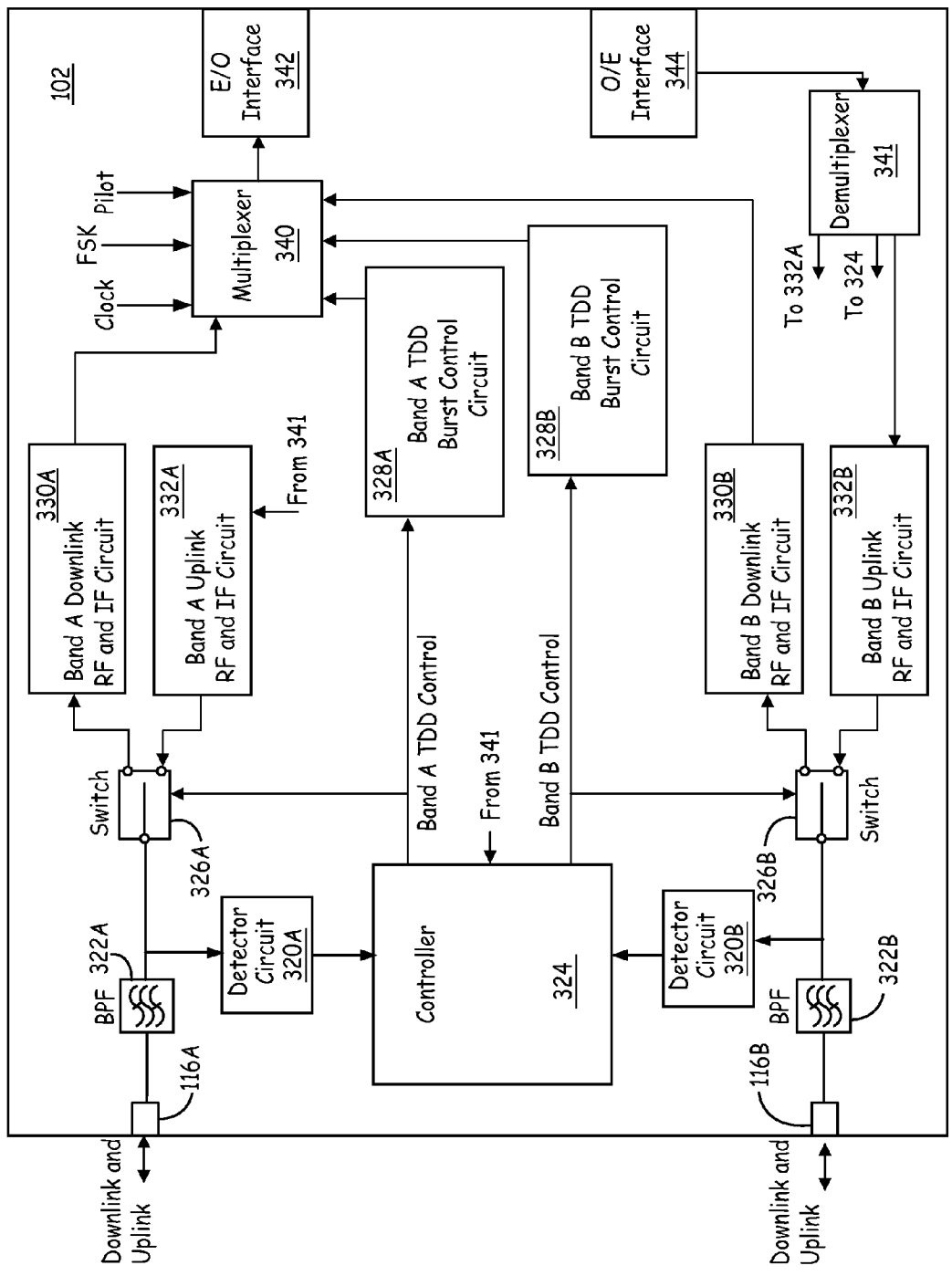
FIG. 3 is a block diagram of one exemplary embodiment of a main hub suitable for use in the system shown in FIG. 1.

FIG. 3 is a block diagram of one exemplary embodiment of a main hub 102 suitable for use in the DAS shown in FIG. 1. As described above, main hub 102 is implemented to distribute TDD WiMAX RF signals. Hub 102 includes two band-pass filters 322, one for each frequency band. The band-pass filters 322 are individually referenced in FIG. 3 as 322A and 322B. Each band-pass filter 322 is coupled to a respective one of the RF interfaces 116 of the main hub 102. Band-pass filters 322 filters out any out-of-band signals (that is, any signals that are outside of the respective frequency band A or B) that are included in the downlink RF signals received on the respective RF interface 116 and in the uplink RF signals output on the respective RF interface 116.

The main hub 102 includes a respective downlink IF circuit 330 and uplink IF circuit 332 for each of the frequency bands A and B. The downlink IF circuits 330 are individually referenced in FIG. 3 as 330A and 330B, and the uplink IF circuits 332 are individually referenced in FIG. 3 as 332A and 332B. For each of the bands A and B, a respective switch 326 is used to selectively couple the respective band-pass filter 322 to either the respective downlink IF circuit 330 or the respective uplink IF circuit 332 under the control of a respective TDD control signal for that band. The switches 326 are individually referenced in FIG. 3 as 326A and 326B.

Each downlink IF circuit 330 downconverts the respective RF signals to a respective IF frequency band. As noted above, in the TDD WiMAX embodiment described here, both of the downlink RF signals for bands A and B have the same RF frequency band and the downlink IF circuits 330 downconvert the RF signals for bands A and B to different IF bands. In one implementation, each downlink IF circuit 330 comprises a mixer that downcoverts the respective RF signals using an appropriate IF reference signal that is generated, for example, from a global reference signal (CLOCK) that is used by the downlink IF circuits 330 and the uplink IF circuits 332 and the corresponding circuits in each of the RAUs 106. In such an implementation, the downcoverted output of the mixer is then conditioned (for example, amplified and/or attenuated to adjust the gain of the downcoverted signal and band-pass filtered to eliminate any out-of-band signals).

A multiplexer 340 combines the downlink IF signals output by the downlink IF circuits 330, the global reference signal (CLOCK), an operations, administration, and maintenance (OAM) channel (FSK), a downlink pilot signal (PILOT), and the TDD control signals for bands A and B. The OAM channel is used for communicating operations, administration, and maintenance information between the main hub 102 and each of the remote antenna units 106. In the particular embodiment shown in FIG. 3, such OAM information is modulated on and demodulated from the OAM channel using frequency-shift keying (FSK) modulation/demodulation. The downlink pilot signal is used to perform downlink automatic gain control in the remote antenna units 106. The downlink IF signals, the global reference signal (CLOCK), the operations channel (FSK), the downlink pilot signal (PILOT), and the TDD control signals for bands A and B are combined using frequency division multiplexing (FDM). The electrical output of the multiplexer 340 is used to modulate an optical carrier (using an analog optical modulator (shown in FIG. 3 as E/O interface 342)). The resulting downlink optical signal is then split and provided to each of the expansion hubs 104.

The main hub 102 also comprises an O/E interface 344 for each of the expansion hubs 104 to which the main hub 102 is connected. Each O/E interface 344 demodulates a respective uplink optical signal transmitted from a respective expansion hub 104. The resulting electrical uplink signal is then demultiplexed by a demultiplexer 341 on a frequency basis to separate the uplink IF signal for frequency band A from the uplink IF signal for frequency band B and to extract an uplink pilot signal (which is used for automatic gain control of the uplink IF signals) and the OAM signal (which is provided to a controller 324 (described below) for processing). The uplink IF signal for each band is supplied to the respective uplink IF circuit 332.

Each uplink IF circuit 332 upconverts the respective uplink IF signals to a respective RF frequency band. As noted above, in the TDD WiMAX embodiment described here, both of the uplink RF signals for bands A and B have the same RF frequency band and each uplink IF circuits 332 upconverts the IF signals for bands A and B (which have differing frequency bands) to the same RF band. In one implementation, each uplink IF circuit 332 comprises a mixer that upcoverts the respective IF signals using an appropriate RF reference signal that is generated, for example, from the global reference signal (CLOCK). In such an implementation, the upcoverted output of the mixer is then conditioned (for example, amplified and/or attenuated to adjust the gain of the upcoverted signal using the uplink pilot signal and band-pass filtered to eliminate any out-of-band signals).

The main hub 102 comprises a controller 324 that controls the operation of the DAS 100. The controller 324 generates each of the TDD control signals for both bands A and B. The controller 324 generates each of the TDD controls signals based on a detection signal produced by a respective detector circuit 320. Each of the detector circuits 320 is individually referenced in FIG. 3 as 320A and 320B. Each detector circuit 320 is coupled to a respective band-pass filter 322. Each detector circuit 320 monitors for communication downlink RF signals propagating in the downlink direction. When each detector circuit 320 detects downlink RF signals, the detector circuit 320 asserts its detection signal to indicate that fact to the controller 324. Each detector circuit 320 can be implemented using any appropriate detector circuit configured to detect signals being communicated in a given direction. An exemplary detector circuit is shown and described in more detail in FIG. 4.

When one of the detector circuits 320 asserts its detection signal, controller 324 asserts a respective TDD control signal for the corresponding frequency band. For example, if detector circuit 320A detects a downlink RF signal for band A, controller 324 asserts its control signal for band A. Each switch 326 is configured to couple the respective downlink IF circuit 330 to the respective RF interface 116 when the TDD control signal is asserted and to couple the respective uplink IF circuit 332 to the respective RF interface 116 when the respective TDD control signal is not asserted. The results of such switching is to enable the respective downlink IF circuit 330 to downconvert and condition any downlink RF signals being communicated in the downlink direction and to enable the respective uplink IF circuit 332 to upconvert and condition any uplink IF signals that are being communicated in the uplink direction.

A TDD burst control signal for each band A and B is also distributed to the remote antenna units 106 in the DAS 100. As a result, the RAUs 106 need not independently determine when they should switch between communicating in downlink direction and communicating in the uplink direction for each of the bands A and B. Instead, the RAUs performing such switching based on an TDD burst control signal that is supplied to the RAUs from the main hub 102 for each band A and B. As described below, the TDD burst control signals for each band A and B are frequency division multiplexed with the two IF frequency bands A and B as well as a global reference signal (CLOCK), downlink pilot signal (PILOT), and operations, administration, and maintenance channel (FSK). The multiplexing is performed by a multiplexer 340. The main hub 102 includes a burst control circuit 328 for each of the frequency bands A and B (which are individually referenced in FIG. 3 as 328A and 328B). Each burst control circuit 328 is used to convert the respective direct current (DC) TDD control signal to a TDD burst control signal having a suitable frequency for frequency division multiplexing with the other signals that are communicated to the RAUs 106. In the particular embodiment described here, each burst control circuit 328 outputs a signal having a suitable frequency when the respective TDD control signal is asserted and outputs no signal when the TDD control signal is not asserted.

Processing of the downlink IF signals in the downlink IF circuits 330 introduce a minimal delay such that the respective TDD burst control signal arrives at the RAU 106 slightly before the corresponding downlink IF signals. Therefore, the RAU 106 is able to switch to communicating in the downlink direction without losing information in the downlink signals. The minimal delay is due to the longer transmission path through the downlink IF circuits 330 through which the TDD burst control signal does not have to pass. Thus, with a single TDD burst control signal for each frequency band, each RAU coupled to main hub 102 is able to synchronize switching between communication in downlink direction and communication in the uplink directions.

Figure 4:
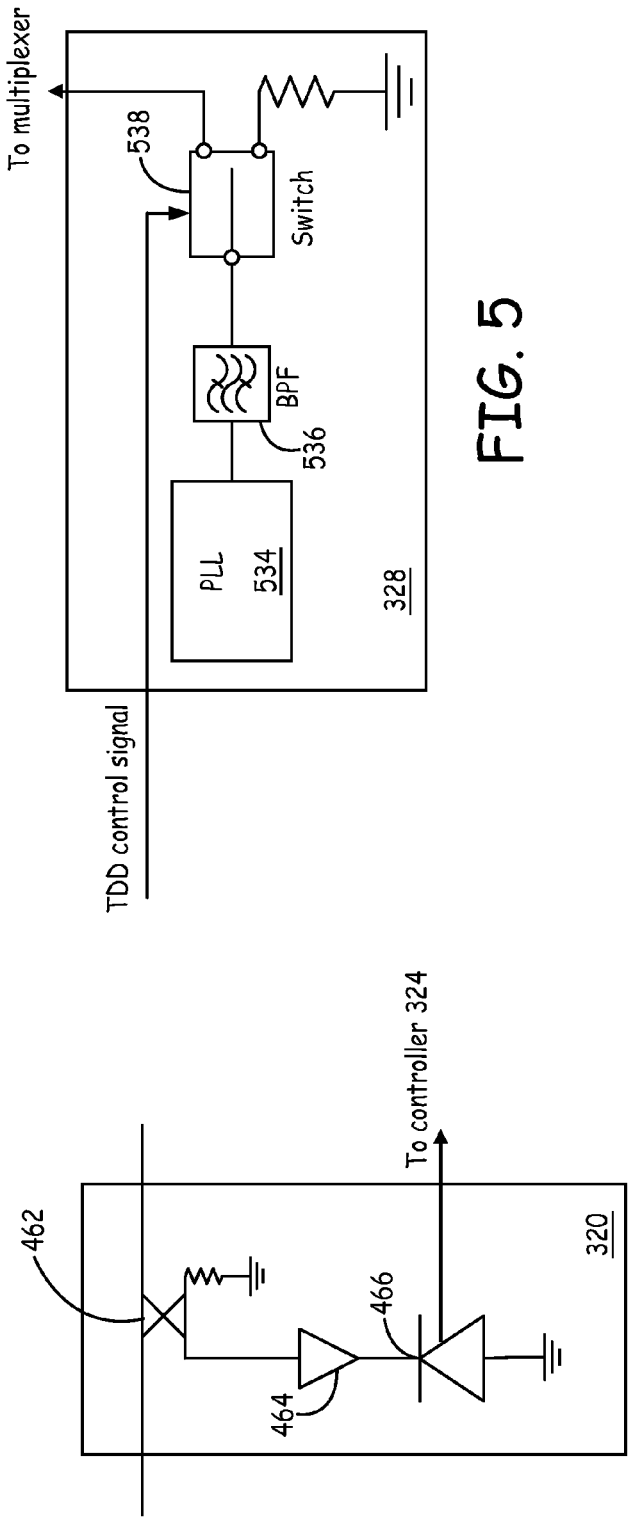
FIG. 4 is a block diagram of one exemplary detector circuit suitable for use in the main hub shown in FIG. 3.

An exemplary detector circuit 322 is shown in FIG. 4. FIG. 4 is a block diagram of an exemplary detector circuit 322 used in a main hub 102. As shown in FIG. 4, detector circuit 322 includes a directional coupler 462 which is configured to unequally split signals propagating in the downlink direction and to fully pass signals propagating in the uplink direction. Thus, a small portion of the signal amplitude for downlink signals is passed through directional coupler 462 to amplifier 464. Amplifier 464 amplifies the split signal by a pre-determined gain. The amplified signal is then passed to detector 466. Detector 466 prohibits the amplified signal from passing to controller 324, unless a threshold amplitude level is exceeded. Thus, detector 466 prevents noise from being misinterpreted as a downlink signal. Once the threshold amplitude level is exceeded, the amplified signal is passed to the controller. Detector 466 can be implemented using various circuit components including, but not limited to, a reversed-biased diode and a root mean square (RMS) detector, and an integrated circuit detector, such as Analog Devices IC part number AD8362. Additionally, detector circuit 322 is not limited to the exemplary detector circuit shown in FIG. 4. For example, in some embodiments, a detector circuit as described in the '921 application or the '916 application is used.

Figure 5:
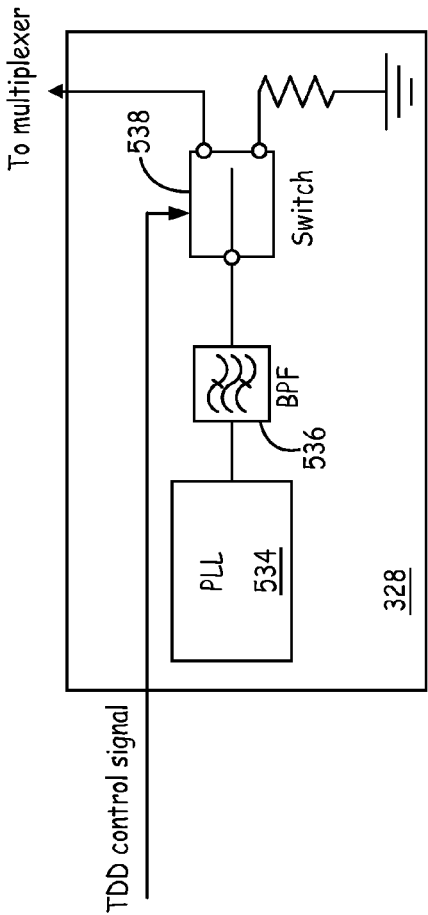
FIG. 5 is a block diagram of one exemplary burst control circuit suitable for use in the main hub shown in FIG. 3.

An exemplary burst control circuit 328 is shown in FIG. 5. As shown in FIG. 5, burst control circuit 328 includes a phase-locked loop (PLL) 534 which is configured to produce a signal at a set frequency and amplitude. Burst control circuit 328 also includes a band-pass filter 536 configured to filter noise in the output of the PLL 534. The burst control circuit 328 comprises a switch 538. When the TDD control signal for that burst control circuit 328 is asserted, switch 538 couples the output of PLL 534 to the multiplexer 340. When the TDD control signal for that burst control circuit 328 is not asserted, the switch 538 does not couple the output of the PLL 524 to the multiplexer 340 and instead shunts the output to ground. Each RAU 106 uses the TDD burst control to determine when to switch between communicating in the downlink direction and communicating in the uplink direction for the respective frequency band. When the RAU 106 detects the TDD burst control signal (that is, the output of the PLL 534) for a given frequency band, the RAU 106 communicates in the downlink direction for that frequency band. When the RAU 106 does not detect the TDD burst control signal for that frequency band, the RAU 106 communicates in the uplink direction for that frequency band.

Figure 6:
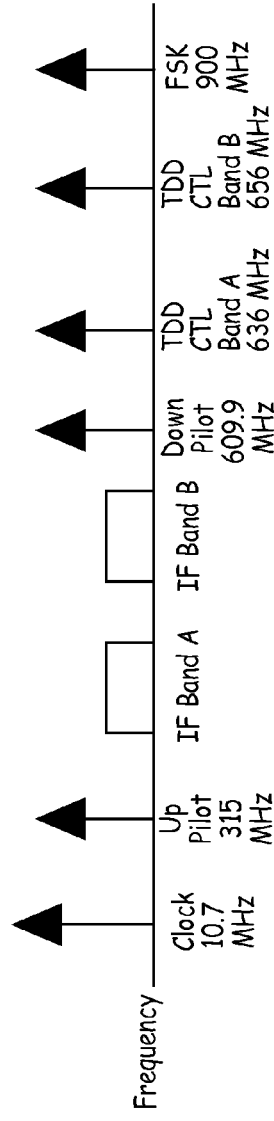
FIG. 6 is an exemplary frequency map for signals communicated to and from the main hub.

FIG. 6 is a frequency map for signals communicated to and from the main hub 102. Notably, the frequencies shown in FIG. 6 and discussed herein are provided by way of example and not by way of limitation. It is to be understood that other frequencies can be used in other embodiments. Each of the IF bands includes a portion (that is, a sub-band) for communicating uplink IF signals and a portion for communication downlink IF signals. The frequency map includes the global reference signal (CLOCK) (at 10.7 MHz in the example shown in FIG. 6). The frequency also includes an IF frequency band which corresponds to each of the RF bands A and B. In some embodiments, bands A and B are selectable to be either 30 MHz or 66 MHz in width. The operational RF and corresponding IF frequency bands are field configured during installation. For example, Table 1 below displays exemplary uplink and downlink IF frequency bands for each of bands A and B when configured as 30 MHz or 66 MHz bands.

TABLE 1

|  | Selectable Filter 66 | Downlink IF Frequency BW | | | Uplink IF Frequency BW | | |
| --- | --- | --- | --- | --- | --- | --- | --- |
|  | MHz or 30 MHz | Low | Center | High | Low | Center | High |
| Band A | IF for 66 MHz BW | 317 | 350 | 383 | 54 | 87 | 120 |
|  | IF for 30 MHz BW | 335 | 350 | 365 | 72 | 87 | 102 |
| Band B | IF for 66 MHz BW | 462 | 495 | 528 | 172 | 205 | 238 |
|  | IF for 30 MHz BW | 480 | 495 | 510 | 190 | 205 | 220 |

The frequency map also includes a downlink pilot signal and an uplink pilot signal (PILOT) (at 609.9 MHz and 315 MHz, respectively, in the example shown in FIG. 6). The Uplink pilot signal in this example is set at 315 MHz between the main hub 102 and expansion hubs 104. Additionally, the uplink pilot signal, in this example, is set at 140 MHz between the expansion hubs 104 and RAU 106. The frequency map also includes the TDD burst control signals for each of the frequency bands A and B (at 636 MHz and 656 MHz, respectively, in the example shown in FIG. 6). The frequency map also includes the OAM channel (FSK) (at 900 MHz in the example shown in FIG. 6).

Figure 7:
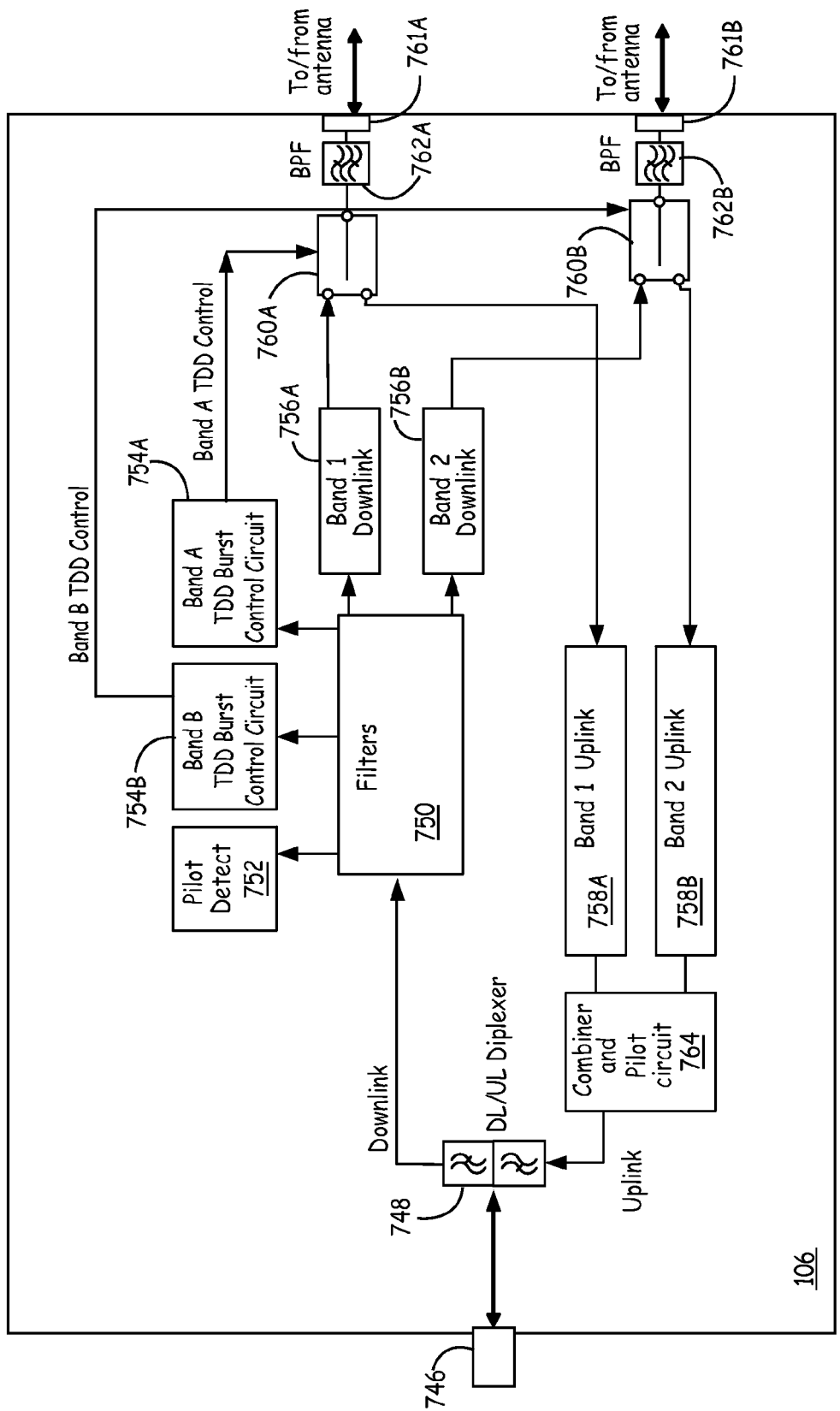
FIG. 7 is a block diagram of one embodiment of a remote antenna unit suitable for use in the system of FIG. 1

FIG. 7 is a block diagram of one embodiment of a remote antenna unit 106 suitable for use in the DAS 100 of FIG. 1. RAU 106 communicatively coupled to a respective expansion hub 104 via a transport interface 746. A diplexer 748 is used to output uplink IF signals and uplink pilot signals on the transport interface 746 and to receive the downlink IF signals, global reference signal, downlink pilot signal, TDD burst control signals, and OAM signal. The downlink signals are separated by filters 750. The pilot signal is passed to the pilot detector 752 for use in controlling the gain of the downlink RF signals that are ultimately radiated from the RAU 106. The TDD burst control signal for each band is passed to a respective TDD burst control circuit 754.

The RAU 106 includes a downlink IF circuit 756 for each of the frequency bands A and B (which are individually referenced as 756A and 756B), and an uplink IF circuit 758 for each of the frequency bands A and B (which are individually referenced as 758A and 758B).

Each downlink IF circuit 756 upconverts the respective downlink IF signals to a respective RF frequency band. As noted above, in the TDD WiMAX embodiment described here, both of the downlink RF signals for bands A and B have the same RF frequency band. The downlink IF circuits 756 upconvert the IF signals for the bands A and B (which have differing IF frequency bands) to the same RF band. In one implementation, each downlink IF circuit 756 comprises a mixer that upcoverts the respective IF signals using an appropriate RF reference signal that is generated, for example, from the global reference signal (CLOCK) that is received at the RAU 106. In such an implementation, the upconverted output of the mixer is then conditioned (for example, amplified and/or attenuated to adjust the gain of the upcoverted signal using the downlink pilot signal and band-pass filtered to eliminate any out-of-band signals). The upconverted RF signal is then supplied to a respective one of the antennas 118 for radiating therefrom (via a respective switch 760 and a respective band-pass filter 762—when the respective switch 760 couples the downlink IF circuit 756 to the antenna 118 as described below). Each of the antennas 118 are coupled to the remote antenna unit 106 (and the components thereof) via a respective radio frequency interface 761.

The uplink RF signals received from each of the antennas 118 are provided to a respective uplink IF circuit 758 (via a respective band-pass filter 762 and a respective switch 760—when the respective switch 760 couples the antenna 118 to the uplink IF circuit 758 as described below). Each uplink IF circuit 758 downconverts the respective uplink RF signals to a respective IF frequency band. As noted above, in the TDD WiMAX embodiment described here, both of the uplink RF signals for bands A and B have the same uplink RF frequency band and the uplink IF circuits 758 downconvert the uplink RF signals for bands A and B to different IF bands. In one implementation, each uplink IF circuit 758 comprises a mixer that downcoverts the respective uplink RF signals using an appropriate IF reference signal that is generated, for example, from a global reference signal (CLOCK) received at the RAU 106. In such an implementation, the downcoverted output of the mixer is then conditioned (for example, amplified and/or attenuated to adjust the gain of the downcoverted signal and band-pass filtered to eliminate any out-of-band signals).

A combiner 764 combines the uplink IF signals output by the uplink IF circuits 758 and the uplink pilot signal. The uplink pilot signal is used to perform uplink automatic gain control in the main hub 102. The uplink IF signals and the uplink pilot signal are combined using frequency division multiplexing. The output of the combiner 764 is output on the transport interface 746 via the diplexer 748.

Each TDD burst control circuit 754 receives the respective TDD burst control signal (if any) for that band that was received at that RAU 106. The TDD burst control circuit 754 determines when the TDD burst control signal is being output by the TDD burst control circuit 328 of the main hub 102. When the TDD burst control circuit 754 determines that the TDD burst control signal is being output, the TDD burst control circuit 754 asserts a respective TDD control signal for the respective band. When the TDD burst control circuit 754 determines that the TDD burst control is not being output, the TDD burst control circuit does not assert the respective TDD control signal for the respective band. In one implementation, each TDD burst control circuit 754 is implemented using a rectifying type circuit. In other implementations, other types of detector circuits are used.

The TDD control signal for each band is coupled to a respective switch 760. Each switch 760 is configured to couple the respective downlink IF circuit 756 to the respective antenna 118 when the respective TDD control signal is asserted and to couple the respective uplink IF circuit 758 to the respective antenna 118 when the respective TDD control signal is not asserted. The results of such switching is to enable the respective downlink IF circuit 756 to upconvert and condition any downlink IF signals being communicated in the downlink direction and to enable the respective uplink IF circuit 758 to downconvert and condition any uplink RF signals that are being communicated in the uplink direction.

Although the embodiments shown in FIGS. 1-7 are described as using one or more expansion hubs 104 to couple the main hub 102 to the remote antenna units 106. In another embodiment, the main hub 102 is coupled to the remote antenna units 106 directly without an expansion hub. In one such embodiment, the main hub is similar to the main hub 102 shown in FIGS. 1 and 3 except that the main hub includes a splitter that splits the downlink IF signal output by the multiplexer 340 into separate instance of the downlink IF signal for each remote antenna unit to which the main hub is coupled. The main hub in such an implementation also includes a separate diplexer for each remote antenna unit to which the main hub is coupled, where the diplexer combines an instance of the downlink IF signal with an uplink IF signal output by the remote antenna unit associated with that diplexer. The main hub, in such an implementation, also includes a combiner that combines all of the uplink IF signals received from the remote antenna units and outputs a combined uplink IF signal that is supplied to the demultiplexer 341. In some embodiments, some of the remote antenna units are coupled to the main hub via an expansion hub and some of the remote antenna units are coupled directly to the main hub without an expansion hub.

Although the embodiments shown in FIGS. 1-7 are described as being implemented to transport two frequency bands, in other embodiments, a different number of frequency bands are transported. For example, in one such embodiment, the DAS is used to distribute a single frequency band (for example, using relatively low bandwidth cabling such as unshielded twisted-pair cabling). In another embodiments, three or more frequency bands are transported.

Although the embodiments shown in FIGS. 1-7 are described as being implemented to transport two MIMO WiMAX frequency bands, in other embodiments, other types of TDD signals are transported (for example, non-MIMO WiMAX signals).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system comprising:
a first unit; and
a second unit communicatively coupled to the first unit;
wherein the first unit is operable to receive a first original radio frequency signal in a first communication direction from an upstream device and the second unit is operable to receive a second original radio frequency signal in a second communication direction from a downstream device;
wherein the first and second original radio frequency signals are originally transmitted on a radio frequency channel using time division duplexing;
wherein the first unit communicates a control signal in the first communication direction to the second unit, the first unit generating the control signal based at least in part on detecting when the first original radio frequency signal is being received at the first unit;
wherein the second unit uses the control signal to determine when to output a first reproduced radio frequency signal in accordance with the time division duplexing used to originally transmit the first and second original radio frequency signals on the radio frequency channel; and
wherein the first reproduced radio frequency signal is derived from the content of the first original radio frequency signal and output from the second unit to the downstream device in the first communication direction.

2. The system of claim 1, wherein the first unit generates the control signal without demodulating the first original radio frequency signal or the second original radio frequency signal.

3. The system of claim 1, wherein the system comprises a distributed antenna system, the first unit comprises a main hub, and the second unit comprises at least one remote antenna unit.

4. The system of claim 3, wherein the main hub is communicatively coupled to the at least one remote antenna unit via at least one expansion hub.

5. The system of claim 1, wherein when the first unit determines that the first original radio frequency signal is being received at the first unit, the first unit outputs a first transport signal to the second unit;
wherein the first transport signal is derived at least in part from the first original radio frequency signal; and
wherein the second unit uses the first transport signal to generate the first reproduced radio frequency signal.

6. The system of claim 5, wherein the first unit generates the first transport signal by down converting at least a portion of the first original radio frequency signal and wherein the second unit generates the first reproduced radio frequency signal by up converting at least a portion of the first transport signal.

7. The system of claim 6, wherein the control signal is combined with the first transport signal for communicating to the second unit.

8. The system of claim 7, wherein the control signal has a predetermined frequency and is combined with the first transport signal using frequency division multiplexing.

9. The system of claim 7, wherein the control signal is output by the first unit when the second unit should output the first reproduced radio frequency signal and is not output by the first unit when the second unit should not output the first reproduced radio frequency signal.

10. The system of claim 1, wherein when the first unit determines that the first original radio frequency signal is not being received at the first unit, the first unit outputs a second reproduced radio frequency signal in accordance with the time division duplexing used to originally transmit the first and second original radio frequency signals on the radio frequency channel, the second reproduced radio frequency signal being derived from the second original radio frequency signal.

11. The system of claim 10, wherein the first unit generates the second reproduced radio frequency signal based on a second transport signal output by the second unit; and
wherein the second unit outputs the second transport signal, the second transport signal being derived at least in part from the second original radio frequency signal; and
wherein the second unit determines when to output the second transport signal based on the control signal.

12. The system of claim 11, wherein the second unit generates the second transport signal by down converting at least a portion of the second original radio frequency signal and wherein the first unit generates the second reproduced radio frequency signal by up converting at least a portion of the second transport signal.

13. The system of claim 1, wherein the first original radio frequency signal comprises an original downlink radio frequency signal and the second original radio frequency signal comprises an original uplink radio frequency signal.

14. The system of claim 1, wherein the first unit is operable to receive a plurality of first original radio frequency signals and the second unit is operable to receive a plurality of second original radio frequency signals;
wherein each of the plurality of first original radio frequency signals and a respective one of the plurality of second original radio frequency signals are originally transmitted on at least one radio frequency channel using time division duplexing; and
wherein for each of the plurality of first original radio frequency signals:
the first unit communicates to the second unit a respective control signal, the first unit generating the respective control signal based at least in part on detecting when the respective first original radio frequency signal is being received at the first unit;
the second unit uses the respective control signal to determine when to output a respective first reproduced radio frequency signal in accordance with the time division duplexing used to originally transmit the respective first and second original radio frequency signals on the respective radio frequency channel; and
wherein the respective first reproduced radio frequency signal is derived from the respective first original radio frequency signal.

15. The system of claim 14, wherein a multiple-input-multiple-output scheme is used to transmit the plurality of original first radio frequency signals and the plurality of original second radio frequency signals on the same radio frequency channel; and
wherein the second unit is coupled to a plurality of antennas, wherein each of the plurality of first reproduced radio frequency signals is output on a respective one of the plurality of antennas and each of the plurality of second original radio frequency signals is received on a respective one of the plurality of antennas.

16. The system of claim 14, wherein the plurality of first original radio frequency signals and the plurality of second original radio frequency signals are originally transmitted on a plurality of radio frequencies using time division duplexing.

17. The system of claim 16, wherein the plurality of first reproduced radio frequency signals are combined using frequency division multiplexing and output by the second unit, and wherein the plurality of second reproduced radio frequency signals are combined using frequency division multiplexing and output by the first unit.

18. The system of claim 1, wherein the original first radio frequency signal and the second original radio frequency signal are transmitted in accordance with an IEEE 802.16e time-division duplexing scheme.

19. The system of claim 1, wherein the first original radio frequency signal is broadcast by a base station and the second original radio frequency signal is broadcast by a wireless unit.

20. The system of claim 19, wherein the base station is communicatively coupled to the first unit via one of: directly connecting the base station to the first unit and wirelessly coupling the base station to the first unit.

21. The system of claim 20, wherein the base station is wirelessly coupled to the first unit via an intermediary device, wherein the intermediary device is directly connected to the first unit via a wired connection.

22. The system of claim 21, wherein the intermediary device comprises at least one of a repeater and a bi-directional amplifier.

23. The system of claim 1 comprising a plurality of second units.

24. The system of claim 1, wherein the original first radio frequency signal and the second original radio frequency signal are transmitted in accordance with one of the WiMAX standard and the WiBro standard.

25. A first unit comprising:
a radio frequency interface to receive a first original radio frequency signal from an upstream device in a first communication direction at the first unit, wherein the first original radio frequency signal and a second original radio frequency signal are originally transmitted on a radio frequency channel using time division duplexing; and
a transport interface to communicatively couple the first unit to at least one second unit;
wherein the first unit outputs a control signal in the first communication direction to the at least one second unit for use by the at least one second unit in determining when to output a first reproduced radio frequency signal in the first communication direction to a downstream device in accordance with the time division duplexing used to originally transmit the first and second original radio frequency signals on the radio frequency channel; and
wherein the first reproduced radio frequency signal is derived from the content of the first original radio frequency signal.

26. The first unit of claim 25, wherein the first unit generates the control signal without demodulating the first original radio frequency signal or the second original radio frequency signal.

27. The first unit of claim 25, wherein when the first unit determines that the first original radio frequency signal is being received at the first unit, the first unit outputs a first transport signal to the second unit for use by the second unit in generating the first reproduced radio frequency signal; and
wherein the first transport signal is derived at least in part from the first original radio frequency signal.

28. The first unit of claim 27, wherein first unit generates the first transport signal by down converting at least a portion of the first original radio frequency signal, wherein the first transport signal is output to the second unit for use by the second unit in generating the first reproduced radio frequency signal by up converting at least a portion of the first transport signal.

29. The first unit of claim 28, wherein the control signal is combined with the first transport signal for communicating to the second unit.

30. The first unit of claim 29, wherein the control signal has a predetermined frequency and is combined with the first transport signal using frequency division multiplexing.

31. The first unit of claim 25, wherein the control signal is output by the first unit when the second unit should output the first reproduced radio frequency signal and is not output by the first unit when the second unit should not output the first reproduced radio frequency signal.

32. The first unit of claim 25, wherein when the first unit determines that the first original radio frequency signal is not being received at the first unit, the first unit outputs a second reproduced radio frequency signal in accordance with the time division duplexing used to originally transmit the first and second original radio frequency signals on the radio frequency channel, the second reproduced radio frequency signal being derived from the second original radio frequency signal.

33. The first unit of claim 32, wherein the first unit generates the second reproduced radio frequency signal based on a second transport signal output by the second unit;
wherein the second unit outputs the second transport signal, the second transport signal being derived at least in part from the second original radio frequency signal; and
wherein the second unit determines when to output the second transport signal based on the control signal.

34. The first unit of claim 33, wherein the second transport signal is generated by the second unit by down converting at least a portion of the second original radio frequency signal and wherein the first unit generates the second reproduced radio frequency signal by up converting at least a portion of the second transport signal.

35. The first unit of claim 32, further comprising:
a detector to detect when the first original radio frequency signal is being received at the first unit;
a first circuit to generate a first transport signal for use by the second unit in generating the first reproduced radio frequency signal, the first circuit generating the first transport signal at least in part from the first original radio frequency signal;
a second circuit to generate the second reproduced radio frequency signal;
a switch operable to switch between causing the first original radio frequency signal to be input to the first circuit and causing the second reproduced radio frequency signal to be output on the radio frequency interface; and
a controller in communication with the detector and the switch;
wherein when the detector detects that the first original radio frequency signal is being received at the first unit, the controller causes the switch to input the first original radio frequency signal to the first circuit;
wherein when the detector detects that the first original radio frequency signal is not being received at the first unit, the controller causes the switch to cause the second reproduced radio frequency signal to be output on the radio frequency interface; and
wherein the controller causes the control signal to be communicated to the second unit.

36. The first unit of claim 25, wherein the first original radio frequency signal comprises an original downlink radio frequency signal and the second original radio frequency signal comprises an original uplink radio frequency signal.

37. The first unit of claim 25, wherein the first unit is communicatively coupled to a plurality of second units via the transport interface.

38. A second unit comprising:
a radio interface to receive a second original radio frequency signal in a second communication direction from a downstream device, wherein a first original radio frequency signal and the second original radio frequency signal are originally transmitted on a radio frequency channel using time division duplexing; and
a transport interface to communicatively couple the second unit to a first unit;
wherein the second unit receives a control signal in a first communication direction from the first unit indicating when the second unit is to output, in accordance with the time division duplexing of the radio frequency channel, a first reproduced radio frequency signal in the first communication direction to the downstream device on the radio frequency channel; and
wherein the second unit uses the control signal to determine when to output the first reproduced radio frequency signal on the radio frequency channel.

39. The second unit of claim 38, wherein the first original radio frequency signal comprises an original downlink radio frequency signal, and the second original radio frequency signal comprises an original uplink radio frequency signal.

40. The second unit of claim 38, wherein the first reproduced radio frequency signal is generated by the second unit at least in part from a first transport signal;
wherein the first transport signal is generated at least in part from the first original radio frequency signal and is communicated from the first unit to the second unit via the transport interface;
wherein the second unit uses the control signal to determine when to output a second transport signal for use by the first unit in generating a second reproduced radio frequency signal; and
wherein the second transport signal is generated by the second unit at least in part from the second original radio frequency signal and is communicated to the first unit via the transport interface.

41. The second unit of claim 40, further comprising:
a first circuit to generate the first reproduced radio frequency signal;
a second circuit to generate the second transport signal; and
a switch operable to switch, based on the control signal, between causing the first reproduced radio frequency signal to be output on the radio frequency interface and causing the second original radio frequency signal to be input to the second circuit.

42. The second unit of claim 41, wherein when the second unit receives the control signal from the first unit, the second unit causes the switch to cause the first reproduced radio frequency signal to be output on the radio frequency interface; and
wherein when the second unit does not receive the control signal from the first unit, the second unit causes the switch to input the second original frequency signal to the second circuit.

43. The second unit of claim 38, wherein the transport interface is operable to communicatively couple the second unit to the first unit via an intermediary unit.

44. A method comprising:
receiving, from an upstream device, a first original radio frequency signal in a first communication direction at a first unit, wherein the first original radio frequency signal and a second original radio frequency signal are originally transmitted on a radio frequency channel using time division duplexing;
detecting when the first original radio frequency signal is being received at the first unit;
outputting a control signal to at least one second unit in the first communication direction, the first unit generating the control signal based at least in part on the detecting of when the first original radio frequency signal is being received at the first unit;
wherein the second unit uses the control signal to determine when to output a first reproduced radio frequency signal in the first communication direction to a downstream device in accordance with the time division duplexing used to originally transmit the first and second original radio frequency signals on the radio frequency channel; and
wherein the first reproduced radio frequency signal is derived from the content of the first original radio frequency signal.

45. The method of claim 44, wherein the control signal is generated without demodulating the first original radio frequency signal or the second original radio frequency signal.

46. The method of claim 44,
further comprising outputting a first transport signal from the first unit to the second unit when the first unit determines that the first original radio frequency signal is being received at the first unit; and
wherein the first transport signal is derived at least in part from the first original radio frequency signal; and
wherein the second unit uses the first transport signal to generate the first reproduced radio frequency signal.

47. The method of claim 46, wherein outputting the first transport signal to the second unit from the first unit comprises down converting at least a portion of the first original radio frequency signal, the first transport signal for use by the second unit to generate the first reproduced radio frequency signal by up converting at least a portion of the first transport signal.

48. The method of claim 47, further comprising combining the control signal with the first transport signal for communicating to the second unit.

49. The method of claim 48, wherein the control signal has a predetermined frequency, and wherein combining the control signal with the first transport signal comprises frequency division multiplexing the first transport signal and the control signal.

50. The method of claim 48, wherein outputting the control signal to the at least one second unit comprises:
outputting the control signal from the first unit to the at least one second unit when the at least one second unit should output the first reproduced radio frequency signal; and
not outputting the control signal to the at least one second unit when the at least one second unit should not output the first reproduced radio frequency signal.

51. The method of claim 44, further comprising, when the first unit determines that the first original radio frequency signal is not being received at the first unit, outputting from the first unit a second reproduced radio frequency signal in accordance with the time division duplexing used to originally transmit the first and second original radio frequency signals on the radio frequency channel, the second reproduced radio frequency signal being derived from the second original radio frequency signal.

52. The method of claim 51, wherein the first unit generates the second reproduced radio frequency signal based on a second transport signal output by the second unit;
wherein the second unit outputs the second transport signal, the second transport signal being derived at least in part from the second original radio frequency signal; and
wherein the second unit determines when to output the second transport signal based on the control signal.

53. The method of claim 52, wherein the second unit generates the second transport signal by down converting at least a portion of the second original radio frequency signal and wherein the first unit generates the second reproduced radio frequency signal by up converting at least a portion of the second transport signal.

54. The method of claim 44, wherein the first original radio frequency signal comprises an original downlink radio frequency signal and the second original radio frequency signal comprises an original uplink radio frequency signal.

55. A method comprising:
receiving, from a downstream device, a second original radio frequency signal in a second communication direction at a second unit, wherein a first original radio frequency signal and the second original radio frequency signal are originally transmitted on a radio frequency channel using time division duplexing;
receiving at the second unit a control signal output in a first communication direction from a first unit indicating when the second unit is to, in accordance with the time division duplexing of the radio frequency channel, output a first reproduced radio frequency signal in the first communication direction on the radio frequency channel to the downstream device;
determining, based on the control signal, when to output from the second unit the first reproduced radio frequency signal on the radio frequency channel; and
outputting from the second unit the first reproduced radio frequency signal on the radio frequency channel when it is determined to do so based on the control signal.

56. The method of claim 55, wherein the first unit outputs the control signal by detecting when the first original radio frequency signal is being received at the first unit.

57. The method of claim 56, wherein the control signal is generated without demodulating the first original radio frequency signal or the second original radio frequency signal.

58. The method of claim 55, wherein the first reproduced radio frequency signal is generated from a first transport signal output from the first unit, wherein the first transport signal is combined with the control signal.

59. The method of claim 55, further comprising outputting a second transport signal when indicated to do so by the control signal, the second transport signal for use by the first unit to generate a second reproduced radio frequency signal.

* * * * *